United States Patent [19]

Wojtowicz

[11] Patent Number: 4,472,187

[45] Date of Patent: Sep. 18, 1984

[54] RAPIDLY DISSOLVING TRICHLOROISOCYANURIC ACID COMPOSITIONS

[75] Inventor: John A. Wojtowicz, Cheshire, Conn.

[73] Assignee: Olin Corporation, New Haven, Conn.

[21] Appl. No.: 458,378

[22] Filed: Jan. 17, 1983

[51] Int. Cl.$^3$ ............................................. E05B 67/38
[52] U.S. Cl. ........................................ 71/67; 210/755; 210/764; 422/29; 422/35; 422/37; 424/249
[58] Field of Search ...................... 422/35, 37, 41, 29; 424/249; 210/755, 764; 71/67

[56] References Cited

U.S. PATENT DOCUMENTS

| | | | |
|---|---|---|---|
| 2,607,738 | 8/1952 | Hardy | 252/99 |
| 3,120,378 | 2/1964 | Lee | 424/249 |
| 3,165,521 | 1/1965 | Slezak | 210/755 |
| 3,166,471 | 1/1965 | Gump | 210/755 |
| 3,213,029 | 10/1965 | Muchow et al. | 252/99 |
| 3,236,726 | 2/1966 | Ross | 167/17 |
| 3,296,069 | 1/1967 | Kowalski | 210/755 |
| 3,558,503 | 1/1971 | Goodenough | 210/755 |
| 3,941,696 | 3/1976 | Melnick | 210/755 |
| 4,288,430 | 9/1981 | Etzel | 424/249 |
| 4,389,318 | 6/1983 | Wojtowicz | 210/755 |

*Primary Examiner*—Ernest G. Therkorn
*Attorney, Agent, or Firm*—Donald F. Clements; James B. Haglind

[57] ABSTRACT

Water sanitizing compositions are disclosed which are comprised of a mixture of trichloroisocyanuric acid and an alkaline earth metal solubility promoting additive selected from the group consisting of the bicarbonate, carbonate, hydroxide, oxide and mixtures thereof of said alkaline earth metal. The compositions have a molar ratio of said additive to trichloroisocyanuric acid of from about 0.3:1 to about 3:1 and a moisture content of less than about 0.2 percent by weight of the compositions.

The novel compositions rapidly dissolve in water bodies such as those found in swimming pools, commodes, automatic dishwashers and the like to quickly provide a sanitizing amount of available chlorine for sanitizing the water.

10 Claims, No Drawings

RAPIDLY DISSOLVING TRICHLOROISOCYANURIC ACID COMPOSITIONS

This invention relates to compositions for sanitizing water bodies. More particularly, this invention relates to trichloroisocyanuric acid compositions for sanitizing water bodies.

Trichloroisocyanuric acid is a known compound for sanitizing water bodies used for such applications as swimming pools, commodes and dishwashers by the formation of available chlorine when dissolved therein. Trichloroisocyanuric acid is produced by known processes such as those described, for example, in U.S. Pat. Nos. 3,757,018 issued Sept. 4, 1973, to R. N. Mesiah; 3,810,982 issued May 14, 1974, to R. N. Mesiah; 3,835,134 issued Sept. 10, 1974, to H. W. Schiessl et al; and 3,835,135 issued Sept. 10, 1974, to D. L. Sawhill. When placed in a water body such as a swimming pool, trichloroisocyanuric acid dissolves slowly to release its available chlorine concentration and sanitize the water body. The solubility rate, for example, for tablets containing about 5 grams of trichloroisocyanuric acid in water at about 25° C. is about 0.1 gram per hour.

Also employed as water sanitizing agents are dry mixtures of trichloroisocyanuric acid with alkali metal salts such as alkali metal phosphates including trisodium phosphate and tetrasodium phosphate as well as sodium carbonate, sodium borate, and sodium silicate where the amount of trichloroisocyanuric acid is in the range of about 0.5 to about 90 percent by weight.

U.S. Pat. No. 3,236,726, which issued Feb. 22, 1966 to E. J. Ross, describes a composition used as a disinfectant for liquid containers that are subject to stain at the liquid surface level, said composition being comprised of between about 5 to 25 percent by weight of trichloroisocyanuric acid as a chlorinating agent, between about 10 and 30 percent by weight of $NaHCO_3$ as an effervescent agent, between about 10 and 30 percent by weight of $NaH_2PO_4$ as a sequestering agent and between about 40 and 70 percent by weight of a light, inorganic basic compound such as $MgCO_3$, MgO, precipitated $CaCO_3$ or air floated $SiO_2$. The purpose of the inorganic basic compound is to form fragmented particles which float at the water level and establish a dispersed film therein to act as a protective barrier.

Fast dissolving, stabilized trichloroisocyanuric acid compositions suitable as sanitizing agents have also been prepared from mixtures of trichloroisocyanuric acid, cyanuric acid, water-soluble alkali metal salts, and moisture. The composition generally contains from about 0.5 to about 40 percent by weight of trichloroisocyanuric acid, about 0.1 to about 1.0 mole of cyanuric acid per mole of trichloroisocyanuric acid, about 0.5 to about 5.0 percent by weight of water as moisture and the remainder as water-soluble alkali metal salt or salts. Water-soluble alkali metal salts which may be used include trialkali metal phosphates, dialkali metal hydrogen phosphates, alkali metal pyrophosphates, water-soluble alkali metal silicates, water-soluble alkali metal borates and water-soluble alkali metal carbonates or bicarbonates. However, these mixtures generally have a maximum available chlorine concentration of only about 36.6 percent.

There is a need for rapidly dissolving compositions containing trichloroisocyanuric acid having higher available chlorine concentrations for use in sanitizing water bodies.

It is an object of the present invention to provide compositions for sanitizing water bodies containing trichloroisocyanuric acid which dissolves rapidly in water.

Another object of the present invention is to provide compositions containing trichloroisocyanuric acid which provide high concentrations of available chlorine for sanitizing water bodies.

An additional object of the present invention is to provide a method for sanitizing water bodies employing a rapidly dissolving composition containing trichloroisocyanuric acid.

These and other objects of the invention are accomplished in the novel composition of this invention for sanitizing water bodies comprised of a mixture of trichloroisocyanuric acid and an alkaline earth metal solubility promoting additive, said additive being selected from the group consisting of carbonate, bicarbonate, hydroxide, oxide and mixtures thereof of said alkaline earth metal. The composition has a molar ratio of the alkaline earth metal compound to trichloroisocyanuric acid in the range of from about 0.3:1 to about 3:1, and has a moisture content of less than about 0.2 percent by weight of the composition and an available chlorine content of between about 40 and about 80 percent.

The novel compositions of the present invention are prepared from trichloroisocyanuric acid having an available chlorine concentration, for example, in the range of from about 80 to about 91.5 percent. Another required ingredient of the novel composition is an alkaline earth metal compound used as a solubility promoting additive. Suitable alkaline earth metal compounds include $MgCO_3$, $Mg(OH)_2$, MgO, CaO, $CaCO_3$, $Ca(OH)_2$ and mixtures thereof, with the magnesium compounds being preferred. These compounds, when blended with trichloroisocyanuric acid, form a mixture which readily reacts in the presence of moisture so it is necessary that the composition be substantially anhydrous, that is, it should have a moisture content of less than about 0.2 percent by weight and preferably less than about 0.1 percent. To maintain the blended mix in such a condition, it should be packaged in air tight, humectantly sealed containers to prevent atmospheric moisture from coming in contact with the product.

Suitable particle sizes for the trichloroisocyanuric acid and the alkaline earth metal compound employed to make the novel compositions of the present invention include those in the range of from about 40 to about 150 microns, and preferably from about 50 to about 100 microns. Such a size range insures good mixing in conventional blending equipment. The final product can be produced in several ways. In one embodiment, small quantities of material can be produced by tabletting the blended mix and grinding the tablets to produce a screened product having the desired size range. Essentially 100 percent recovery can be obtained by regrinding oversize material and retabletting undersize material. In a second embodiment, commercially available compaction granulation equipment can be satisfactorily used for large quantities.

The novel compositions of the present invention are granular homogeneous particles having a screen size between about 10 and about 100 mesh, and preferably between about 20 to about 50 mesh.

When produced as hereinabove described, the compositions of trichloroisocyanuric acid and alkaline earth metal compound of this invention have a molar ratio of the alkaline earth metal compound to trichloroisocyanuric acid of from about 0.3:1 to about 3:1 and have an available chlorine concentration in the range of about 40 to about 80 percent by weight.

When the homogeneous granular particles produced as hereinabove described are added to a water body such as that found in a swimming pool, commode or dishwasher, a reaction between the trichloroisocyanuric acid and the alkaline earth metal compound takes place which is believed to be generally expressed by the following equations in which magnesium carbonate is the alkaline earth metal compound:

$$2Cl_3C_3N_3O_3 + MgCO_3 + H_2O \rightarrow Mg(Cl_2C_3N_3O_3)_2 + 2HOCl + CO_2$$

That is, magnesium dichloroisocyanurate and hypochlorous acid are produced in situ. With additional $MgCO_3$, the reaction continues as follows:

$$MgCO_3 + 2HOCl \rightarrow Mg(OCl)_2 + H_2O + CO_2$$

The reaction takes place rapidly and the magnesium dichloroisocyanurate and hypochlorous acid (or the magnesium salt thereof) formed readily release their available chlorine contents to the surrounding aqueous medium.

The addition of a sufficient proportion of the novel granular composition to impure water rapidly effects sanitation thereof due to the release of available chlorine to the water. The amount added will depend on the end use envisaged. For example, in swimming pools, "sufficient" is defined as having available chlorine in an amount equal to between about 1 and about 1.5 ppm in the water. The response to water is essentially immediate and requires no special features such as protective barriers to be effective. Further, when a carbonate of an alkaline earth metal is used, carbon dioxide gas is released during the reaction. This effervesence continues until the reaction is complete. This visual confirmation of sanitizing action is not provided by other prior art compositions since the solubility rates of these compositions are considerably lower and significant amounts of effervescence do not occur.

The novel composition of the present invention may contain small quantities, for example, from about 1 to about 10 percent by weight of additional ingredients such as algaecides, which are commonly employed in the treatment of water bodies. Suitable algaecides which can be incorporated in the compositions include, for example, quaternary ammonium compounds, bis(ethylamino-)chloro-s-triazine, halogenated quinones, sodium chlorate, polyoxyethylene-dimethyliminoethylene-dimethyliminoethylene dichloride, copper sulfate and copper chelates with ethylene diamine tetraacetic acid (EDTA), triethanolamine (TEA), gluconic acid, or citric acid. These additives are generally present in small amounts which are insufficient to reduce significantly the available chlorine concentration of the compositions. Further, as the novel composition of the present invention are substantially anhydrous and non-hygroscopic, they are compatible with additives such as those cited above with a minimal risk of a chemical interaction.

The novel compositions of the present invention are particularly useful in sanitizing water bodies having water at temperatures, for example, in the range of from about 5° to about 45° C. Compositions of the present invention have solubility rates comparable to those of alkali metal dichlorocyanurates and their hydrates without requiring the added costs encountered in manufacturing these salts.

The use of the novel composition of the present invention is further illustrated by the following examples. All percentages are by weight unless otherwise specified.

EXAMPLE 1

About 50 g of a powdered homogeneous mixture containing about 7.65 g of $MgCO_3$ (0.09 mol) and about 42.35 g (0.223 mol) of anhydrous trichlorocyanuric acid for a molar ratio of about 0.4:1, and an available chlorine content of about 75 percent was pressed into a tablet having a diameter of about 3 inches and a thickness of about 0.125 inches in a standard 25 ton press. The tablet was broken up with a mortar and pestle and the ground mixture was passed first through a 20 mesh screen and then through a 30 mesh screen.

About 5 g of the material retained on the 30 mesh screen (mesh size −20/+30) was added to 55 gallons of tap water at 25° C. contained in a 10 inch diameter by 48 inch deep cylindrical vessel having a conical bottom. After 5 minutes, about a liter of solution containing the undissolved portion of the sample was removed from the bottom filtered and the filtrate returned to the vessel. The solution was then circulated by means of a small centrifugal pump for about 5 minutes after which a filtered sample was taken and analyzed for chlorine content. The "percent dissolved" chlorine, based on a comparison of the concentration of available chlorine in the solution and that of the ground sample, was 100 percent.

EXAMPLE 2

Example 1 was repeated but with a composition containing about 10.5 g (0.26 mol) MgO and about 39.5 g (0.21 mol) trichloroisocyanuric acid for a molar ratio of about 1.24:1 and an available chlorine content of about 71 percent. The "percent dissolved" was about 95.

EXAMPLE 3

Example 1 was repeated but with a mixture having about 12.5 g (0.12 mol) $CaCO_3$ and about 37.5 g (0.20 mol) trichloroisocyanuric acid for a molar ratio of about 0.6:1 and an available chlorine content of about 69 percent. The "percent dissolved" was about 94.

COMPARATIVE EXAMPLE A

Example 1 was repeated but with a mixture having about 10.1 g (0.08 mol) $MgSO_4$ and about 39.5 g (0.21 mol) trichloroisocyanuric acid for a molar ratio of about 0.48:1 and an available chlorine content of about 69 percent. The "percent dissolved" was about 28.

COMPARATIVE EXAMPLE 1

Example 1 was repeated but with no additive being added to the trichloroisocyanuric acid. The available chlorine content was about 90 percent and the "percent dissolved" was about 16.

Comparative Example A shows that only 28 percent of the mixture dissolved when magnesium sulfate was used as the additive, thus demonstrating that not all alkaline earth metal compounds are effective. Comparative Example B shows that when no additive was mixed with the trichloroisocyanuric acid, there was only 16 percent dissolved under the conditions of the test, thus illustrating the slow dissolving rate of trichloroisocyanuric acid.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A dispersible, quick dissolving composition for sanitizing water bodies comprised of a homogeneous mixture of trichlorocyanuric acid and an alkaline earth metal solubility promoting additive, each of the components of said homogeneous mixture having a particle size in the range of about 40 to about 150 microns and having an additive/acid molar ratio of from about 0.3:1 to about 3:1, said additive being selected from the group consisting of the oxide, hydroxide, carbonate and mixtures thereof of calcium and magnesium, said composition being compacted and granulated to form particles in a size range of from about 10 to about 100 mesh.

2. The composition of claim 1 wherein said particle size range is between about 20 and about 50 mesh.

3. The composition of claim 1 wherein said mixture a water content of less than about 0.2 percent by weight of said mixture.

4. The composition of claim 3 wherein said moisture content is below about 0.1 percent by weight of said mixture.

5. The composition of claim 1 wherein the chlorine availability of said mixture is in the range between about 40 and about 80 percent by weight.

6. The composition of claim 1 wherein said additive is $MgCO_3$.

7. The composition of claim 1 wherein said additive is MgO.

8. The composition of claim 1 wherein said additive is $CaCO_3$.

9. The composition of claim 1 wherein said mixture contains an algaecide.

10. The composition of claim 1 wherein the particle size range of each of said components is from about 50 to about 100 microns.

* * * * *